(12) United States Patent
Barry et al.

(10) Patent No.: US 10,193,319 B2
(45) Date of Patent: *Jan. 29, 2019

(54) ASYMMETRIC AEOLIAN VIBRATION DAMPER

(71) Applicant: Central Michigan University, Mount Pleasant, MI (US)

(72) Inventors: Oumar Rafiou Barry, Mount Pleasant, MI (US); Emadeddin Y. Tanbour, Ann Arbor, MI (US); Nitish Kumar Vaja, Mount Pleasant, MI (US); Hesham Tanbour, Ann Arbor, MI (US)

(73) Assignee: Central Michigan University, Mount Pleasant, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/911,823

(22) Filed: Mar. 5, 2018

(65) Prior Publication Data
US 2018/0316172 A1 Nov. 1, 2018

Related U.S. Application Data

(63) Continuation of application No. 15/497,688, filed on Apr. 26, 2017, now Pat. No. 9,948,081.

(51) Int. Cl.
*H02G 7/14* (2006.01)
*H02G 7/05* (2006.01)

(52) U.S. Cl.
CPC .............. *H02G 7/14* (2013.01); *H02G 7/053* (2013.01)

(58) Field of Classification Search
CPC .................................. H02G 7/14; H02G 7/053

USPC .......................................................... 174/42
See application file for complete search history.

(56) References Cited

U.S. PATENT DOCUMENTS

| | | |
|---|---|---|
| 1,675,391 A | 7/1928 | Stockbridge |
| 2,988,047 A | 6/1961 | Hurdle |
| 3,400,209 A | 9/1968 | Toshikazu et al. |
| 3,711,624 A | 1/1973 | Dulhunty |

(Continued)

FOREIGN PATENT DOCUMENTS

WO 2015013406 1/2015

OTHER PUBLICATIONS

Vaja et al., "On the Modeling and Analysis of a Vibration Absorber for Overhead Power lines with Multiple Resonant Frequencies," Under Review, Journal of Engineering Structure,submitted by N.K. Vaja, O.R. Barry, and E.Y. Tanbour, joint inventors of the present application,on Mar. 5, 2017 (21 pages).

*Primary Examiner* — Dhiru R Patel
(74) *Attorney, Agent, or Firm* — Michael Best & Friedrich LLP (57) ABSTRACT

An asymmetric Stockbridge damper having at least six and as many as ten resonant frequencies. The damper includes two assemblies, each having a primary weight at the end of a messenger cable and two secondary weights at the ends of thin beams. The thin beams are mounted at one end to the primary weight and each support a secondary weight at an opposite end. The thin beams extend parallel to the messenger cable. The messenger cable is affixed to a clamp assembly which clamps to an overhead transmission line. The clamp assembly includes a toggle crank generating a theoretically infinite clamping force on the transmission line.

22 Claims, 7 Drawing Sheets

(56) References Cited

U.S. PATENT DOCUMENTS

| | | |
|---|---|---|
| 6,469,246 B1 | 10/2002 | Van Dyke et al. |
| 6,774,303 B1 | 8/2004 | Brittain et al. |
| 6,943,290 B2 * | 9/2005 | Dulhunty ................ H02G 7/14 |
| | | 174/130 |
| 2011/0024152 A1 | 2/2011 | Espindola |

* cited by examiner

ASYMMETRIC AEOLIAN VIBRATION DAMPER

REFERENCE TO

This application is a continuation of U.S. application Ser. No. 15/497,688 filed Apr. 26, 2017, now U.S. Pat. No. 9,948,081.

BACKGROUND

The present invention relates to a vibration damper for use on a wire, cable, or other flexible line to dampen Aeolian vibrations which might give rise to fatigue in the line.

SUMMARY

In one aspect, the invention provides a vibration damper for damping Aeolian vibrations in a flexible line describing a curve, the vibration damper comprising: a clamp adapted to attach the damper to the line at a connection point on the curve, the clamp including first and second opposite sides; a first messenger cable extending parallel to a tangent of the curve at the connection point, the first messenger cable extending from the first side of the clamp to a first distal end; a second messenger cable extending parallel to the tangent of the curve at the connection point, the second messenger cable extending from the second side of the clamp to a second distal end; a first primary weight interconnected to the first distal end of the first messenger cable; a second primary weight interconnected to the second distal end of the second messenger cable; a first beam extending from the first primary weight; a second beam extending from the first primary weight; a third beam extending from the second primary weight; a fourth beam extending from the second primary weight; a first secondary weight connected to an end of the first beam; a second secondary weight connected to an end of the second beam; a third secondary weight connected to an end of the third beam; and a fourth secondary weight connected to an end of the fourth beam.

According to some aspects of the invention, the vibration damper possesses six to ten different resonant frequencies. According to some aspects of the invention, the first messenger cable is of a different length than the second messenger cable. According to some aspects of the invention, the first primary weight has a mass that is different from the second primary weight. According to some aspects of the invention, the first and second primary weights oscillate in a rotational direction about a longitudinal axis of the respective first and second messenger cables. According to some aspects of the invention, the first beam extends from the first primary weight toward the first side of the clamp; the second beam extends from the first primary weight toward the first side of the clamp; the third beam extends from the second primary weight toward the second side of the clamp; and the fourth beam extends from the second primary weight toward the second side of the clamp. According to some aspects of the invention, the first and second beams extend parallel to the first messenger cable and are positioned on opposite sides of the first messenger cable; and the third and fourth beams extend parallel to the second messenger cable and are positioned on opposite sides of the second messenger cable. According to some aspects of the invention, each of the first, second, third, and fourth beams includes a large surface having a relatively large surface area and a small surface having a relatively small surface area, the large surface facing toward the line to which the damper is clamped; and an area moment of inertia of each beam is larger about an axis perpendicular to the large surface than about an axis perpendicular to the small surface. According to some aspects of the invention, each of the first, second, third, and fourth secondary weights has a unique mass value. According to some aspects of the invention, each of the first, second, third, and fourth secondary weights has the oscillation characteristics of a point mass. According to some aspects of the invention, each of the first, second, third, and fourth secondary weights are spherical or any other lumped shape that maintains reasonably point mass characteristics. According to some aspects of the invention, the clamp includes: a clamp body including a messenger housing to which each of the first and second messenger cables are secured; a clamp head adapted to partially surround the line; a slider movable into and out of engagement with the line to capture the line against the clamp head; and an actuator for moving the slider into and out of engagement with the line. According to some aspects of the invention, the slider is slidably mounted to the clamp body and moves linearly with respect to the clamp body and clamp head into and out of engagement with the line. According to some aspects of the invention, the actuator includes a pivoting member pivotably coupled to the clamp body and a fastener engaging both the clamp body and the pivoting member to cause the pivoting member to pivot in a tightening direction and an untightening direction; and movement of the pivoting member in the tightening direction causes the slider to move into engagement with the line and movement of the pivoting member in the untightening direction causes the slider to move out of engagement with the line.

In another aspect, the invention provides a clamp assembly comprising: a clamp body including a clamp head defining a first clamping surface; a slider mounted to the clamp body for linear sliding motion with respect to the clamp head, the slider defining a second clamping surface facing the first clamping surface; and a toggle crank pivotably mounted to the clamp body and including a cam surface in contact with the slider; and an actuator for pivoting the toggle crank toward the clamp body, such that interaction of the cam surface against the slider causes the slider to slide toward the clamp head and generating a theoretically infinite clamping force between the first and second clamping surfaces.

According to some aspects of the invention, the actuator includes a bolt extending through the toggle crank and threaded into the clamp body, rotation of the bolt with respect to the clamp body cause the bolt to move the toggle crank toward the clamp body. According to some aspects of the invention, the toggle crank includes a slot through which the bolt extends, the slot accommodating pivoting movement of the toggle crank with respect to the bolt. According to some aspects of the invention, the clamp body includes an arm to which the toggle crank is pinned to enable pivotable movement of the toggle crank with respect to the clamp body. According to some aspects of the invention, the invention includes a pair of guides restraining movement of the slider away from the clamp body and guiding linear sliding movement of the clamp with respect to the clamp body. According to some aspects of the invention, the slider includes a low friction surface in engagement with the clamp body to facilitate sliding movement of the slider with respect to the clamp body.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
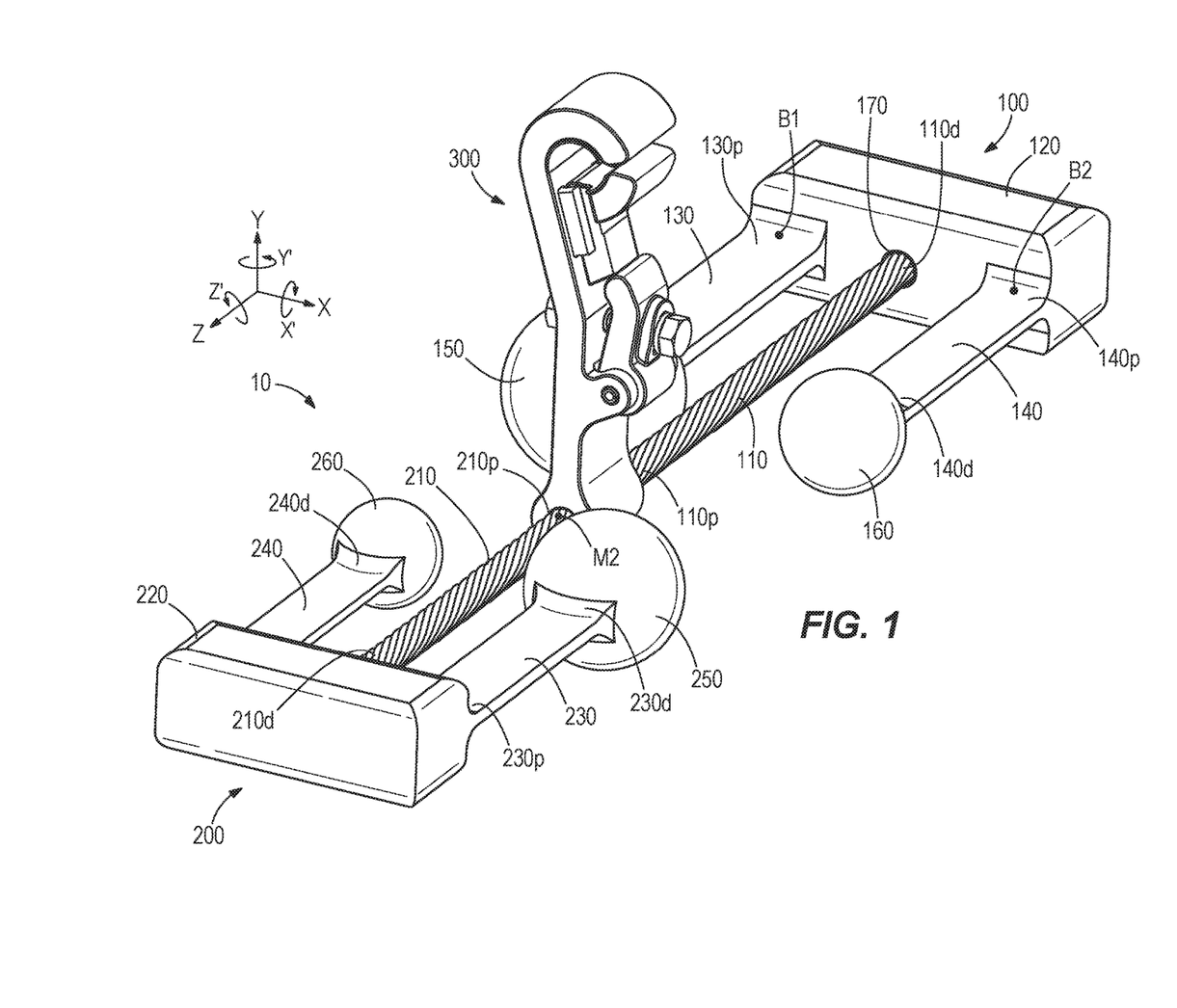
FIG. 1 is a top perspective view of an embodiment of an Aeolian vibration damper for overhead transmission lines according to the present invention.
Figures 2, 8:
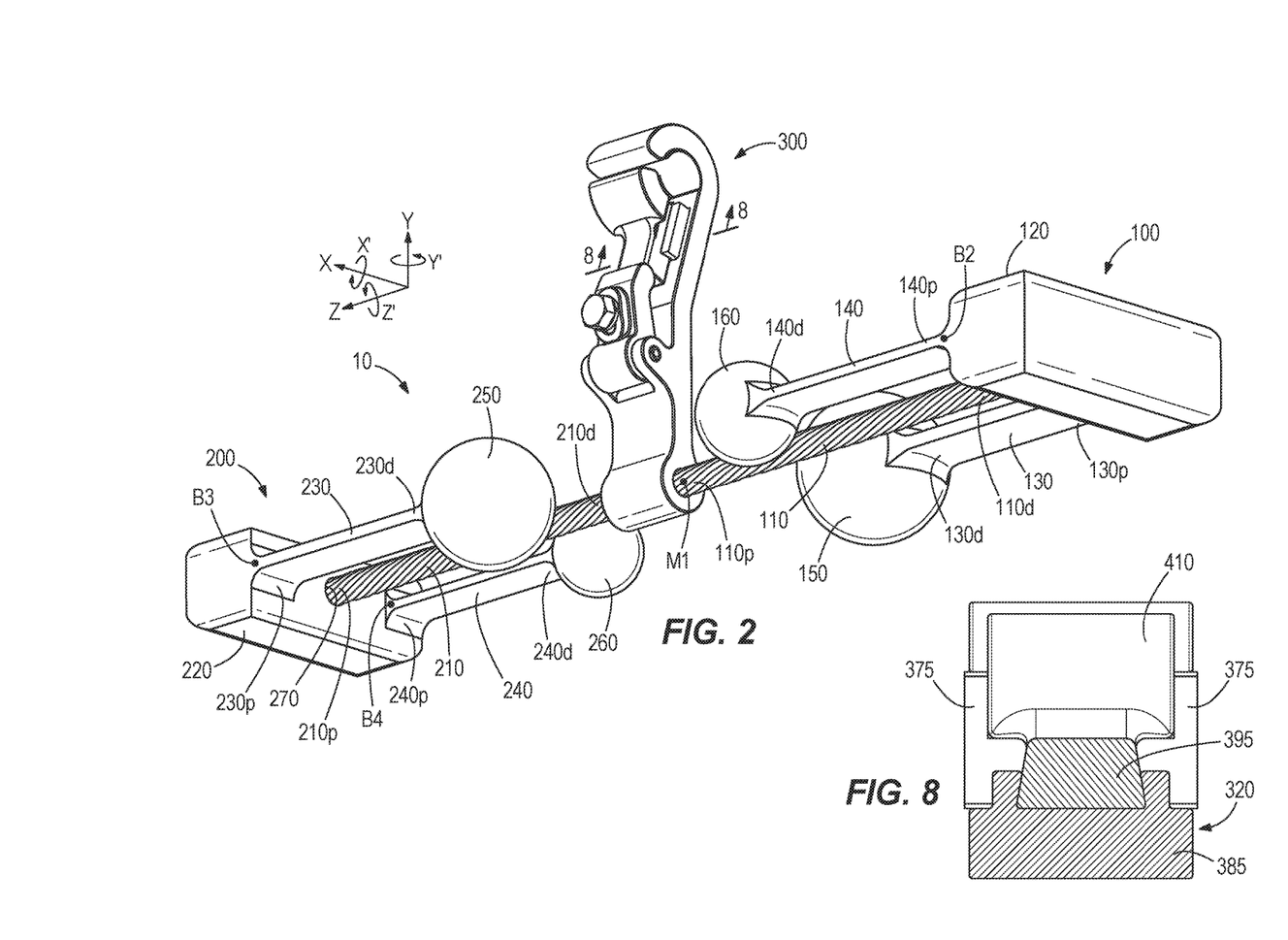
FIG. 2 is a bottom perspective view of the vibration damper.
FIG. 8 is a cross-section view taken along line 8-8 in FIG. 2.
Figure 10:
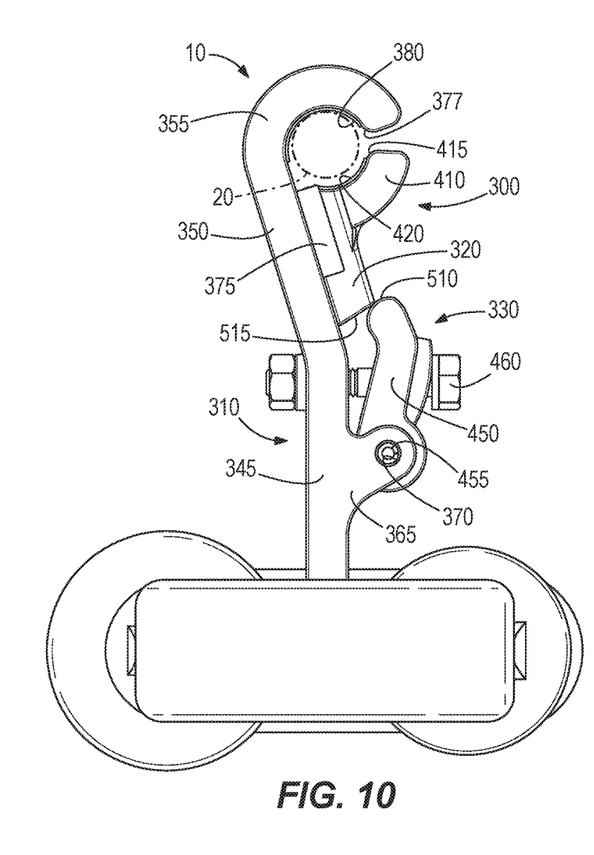
FIG. 10 is a side view of the vibration damper with the clamp assembly in an unengaged condition.
Figure 11:
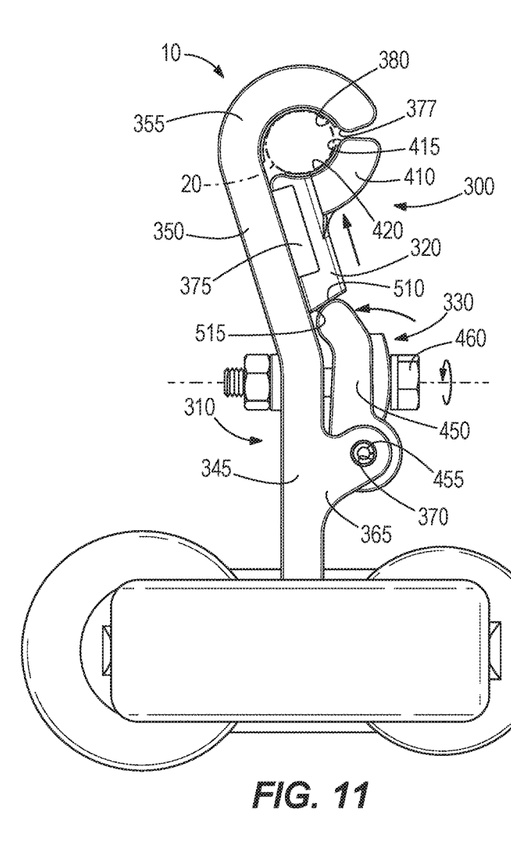
FIG. 11 is a side view of the vibration damper with the clamp assembly in an engaged condition.

FIGS. 1 and 2 illustrate a vibration damper 10 for use on an overhead power transmission line 20 (FIGS. 10-11). The vibration damper 10 could alternatively be applied to substantially any wire, cable, or other line under tension (e.g., a guy wire or a wire in a fence or building system) for which fatigue arising from relatively low-frequency vibrations is a concern. The vibration damper 10 is specifically designed to dampen vibrations in the Aeolian frequency range. Aeolian vibrations can cause fatigue and eventual failure of the line 20. These are the most common kinds of vibrations observed in transmission lines and are caused by vortex shedding due to the laminar flow of wind. These low amplitude vibrations are characterized by frequencies between 3-150 Hz. The vibrations are noticed in the vertical plane, causing alternating bending stresses and eventual failure of the conductor cable. The disclosed vibration damper 10 is an improvement on a traditional Stockbridge damper and may be characterized as an asymmetric Stockbridge damper that expands the number of resonant frequencies beyond any known design of this type of damper.

The vibration damper 10 includes a first assembly 100, a second assembly 200, and a clamp assembly 300 connected to the first assembly 100 and the second assembly 200. FIGS. 1 and 2 illustrate the vibration damper 10 in its intended operating position, in which the clamp assembly 300 is clamped onto the line 20 and the rest of the damper 10 hangs below the line 20. Spatial references such as "up", "down", "above", "below" and the like will be made with respect to the ordinary operating position of the vibration damper 10.

It is convenient to use the coordinate references (x, y, and z) illustrated in FIGS. 1 and 2 when describing the components of the vibration damper 10. Vertical motion is along the y axis while horizontal motion is generally along the x and z axes. Rotation or torque about the respective axes is denoted with x', y', and z'. As noted above, Aeolian vibrations operate in the vertical plane. Such vibrations in the vertical plane can be dampened by generally up-and-down motion along the y axis.

The basic construction of the first and second assemblies 100, 200 are essentially identical except that certain dimensions of the components are different to give rise to unique resonant frequencies. Other than these dimensional differences, which will be discussed below, the first and second assemblies 100, 200 are mirror images of each other.

The first assembly 100 includes a first messenger cable 110, a first primary weight 120, a first beam 130, a second beam 140, a first secondary weight 150, and a second secondary weight 160.

The line 20 describes a curve as it droops between support structures. The clamp assembly connects to the line 20 at a connection point. In an at-rest or neutral position, the first messenger cable 110, first beam 130, and second beam 140 each extends parallel to a tangent of the curve at the connection point. For example, if the connection point is at the lowest point (i.e., the exact "bottom") of the curve, the first messenger cable 110, first beam 130, and second beam 140 would be horizontal because a tangent to the bottom of the curve would typically be horizontal. The following description assumes that the connection point is the bottom of the curve and the first messenger cable 110, first beam 130, and second beam 140 are horizontal, but in reality, the connection point is likely to be somewhere else along the curve of the line 20.

Each of the first messenger cable 110, first beam 130, and second beam 140 has a longitudinal axis generally along the z axis. The first messenger cable 110 includes a proximal end 110p connected to a first side of the clamp assembly 300 and a distal end 110d connected to the first primary weight 120. The first beam 130 and the second beam 140 each include a proximal end 130p, 140p connected to the first primary weight 120 and a distal end 130d, 140d connected to the respective first and second secondary weights 150, 160. For reference, local x, y, and z coordinates have origins at M1 (the proximal end 110p of the first messenger cable 110 where its fixed to the clamp assembly 300), B1 (the proximal end 130p of the first beam 130), and B2 (the proximal end 140p of the second beam 140).

Up-and-down movement of the first primary weight 120, first secondary weight 150, and second secondary weight 160 is not purely vertical movement. In each case the weight 120, 150, 160 describes an arc as the first messenger cable 110, first beam 130, and second beam 140 bends or flexes (x' motion, referred to as "flexion") about the local x axis at origins M1, B1, and B2. Because the vertical component of such arcuate movement is dominant within the designed ranges of movement and because only the vertical component is relevant to damping Aeolian vibrations, such movement is referred to simply as "vertical" for the purposes of this disclosure.

The first messenger cable 110 has freedom to flex about all axes (x, y, z) centered at origin M1, and is also able to twist (z' motion) about its longitudinal axis (z axis). Only flexion x' about the local x axis at origin M1 (resulting in vertical motion of the first primary weight) is relevant to Aeolian vibrations.

The first primary weight 120 has the general shaped of a rectangular block (i.e., generally rectangular sides and generally square ends). The first primary weight 120 includes a major dimension extending horizontally, generally along the local x-axis. The first primary weight 120 can therefore be characterized as perpendicular to the first messenger cable 110. The first primary weight 120 includes a receiving hole 170 in one side for receiving the distal end 110d of the first messenger cable 110. The distal end 110d of the first messenger cable 110 is secured to the first primary weight 120 in the receiving hole 170 by any suitable means (e.g., mechanical fastener, press-fit, adhesive). Relevant to Aeolian vibration damping, the first primary weight 120 is free to move vertically at the distal end 110d of the first messenger cable 110.

The first and second beams 130, 140 extend parallel to, and on opposite sides of, the first messenger cable 110 from the first primary weight 120 toward the clamp assembly 300. The illustrated first and second beams 130, 140 have relatively wide and flat rectangular upper and lower sides and relatively thin rectangular side edges. In this regard the first and second beams 130, 140 may be referred to as "thin beams." In other embodiments, the beams 130, 140 may have other shapes, but the largest surface area should face the line 20. An area moment of inertia of each beam 130, 140 about a vertical axis (i.e., they axis, which is perpendicular to the upper and lower sides) is larger than an area moments of inertia about the horizontal x and z axes. Consequently, each beam 130, 140 stiffly resists flexion (y' motion) about the vertical (y) axis at origin points B1, B2, and is more compliant or permissive to flexion (x' and z' motion) about the horizontal (x, z) axes. The first and second beams 130, 140 can be formed integrally with the first primary weight 120 and the respective first and second secondary weights 150, 160, or may be formed separately and interconnected during assembly.

The first secondary weight 150 and the second secondary weight 160 have unique mass values (i.e., their masses are different from each other). The illustrated first and second secondary weights 150, 160 are spherical and behave like point masses. An object behaves like a point mass, as the term is used herein, when it is generally symmetrical about its center of mass, such that the dominant inertial forces are translational and there are relatively insignificant inertial rotating forces about any axis through its center of mass. Such objects can be referred to as lumped shapes. In other embodiments the secondary weights 150, 160 can have lumped shapes or non-spherical shapes, provided they behave like point masses.

Because the first and second secondary weights 150, 160 behave like point masses, they apply inertial forces to the distal ends of the beams 130, 140 only in the x, y, and z directions and do not apply significant torque z' to the beams 130, 140 about the longitudinal axes of the beams. Because of the relatively high moment of inertia of each beam 130, 140 about the y axis, and the fact that the secondary weights 150, 160 do not apply inertial torque z' about the z axis due to their point-mass behavior, the inertial loading of the secondary weights 150, 160 on the beams 130, 140 results in only flexion x' of the beams 130, 140 about the x axis centered on origins B1 and B2. In other words, the sole mode of movement of the secondary weights 150, 160 and beams 130, 140 is vertical motion in the direction perpendicular to the large surface area of the beam.

The second assembly 200 includes a second messenger cable 210, a second primary weight 220, a third beam 230, a fourth beam 240, a third secondary weight 250, and a fourth secondary weight 260. The second messenger cable 210 connects at is proximal end 210p to a second side of the clamp assembly. Local coordinate origins M2, B3, and B4 are similar to the respective local coordinate origins M1, B1, and B2 discussed above. As noted above, the second assembly 200 is identical in construction to the first assembly 100, but the dimensions of its components are different from those of the first assembly 100. More specifically, each messenger cable 110, 210 and beam 130, 140, 230, 240 has a unique length, and each primary weight 120, 220 and secondary weight 150, 160, 250, 260 has a unique mass.

In one exemplary embodiment, the first and second messenger cables 110, 210 are constructed of AISI 316 stainless steel, tempered at 723 degrees Celsius. In the exemplary embodiment, the first messenger cable 110 is 156 mm long and the second messenger cable 210 is 206 mm long. In this example, all of the weights and beams are made of AISI 4130 carbon steel, annealed at 865 degrees Celsius. In this example, the first primary weight 120 is 76 mm wide, 52.25 mm long, and 28.50 mm deep, and has a mass of 0.7425 Kg. In this example, the second primary weight 220 is 76 mm wide, 60 mm long, and 30 mm deep, and has a mass of 0.5257 Kg. In this example, the first beam 130 has a length of 71.90 mm, the second beam 140 has a length of 71.06 mm, the third beam 230 has a length of 72.99 mm, and the fourth beam 240 has a length of 74.94 mm. Also in this example, the first secondary weight 150 has a radius of 21.85 mm and a mass of 0.4500 Kg, the second secondary weight 160 has a radius of 14.25 mm and a mass of 0.1600 Kg, the third secondary weight 250 has a radius of 24 mm and a mass of 0.3500 Kg, and the fourth secondary weight 260 has a radius of 15 mm and a mass of 0.1100 Kg.

In view of the foregoing, the components of the first and second assemblies 100, 200 can be said to have at least one unique aspect (e.g., length or mass). In other embodiments of the invention, the vibration damper 10 could be tuned by providing different combinations of unique aspects. For example, in another embodiment, the beams or messenger cables may have the same length but unique stiffness or mass moment of inertia owing to different shapes or materials being applied to each one.

In alternative embodiments, the first and second messenger cables 110, 210 can be provided by a single cable that extends through the base of the clamp assembly 300. In such embodiments, the first and second messenger cables 110, 210 would be segments of the single continuous cable and the proximal ends of the messenger cables 110, 210 would be the portion of the respective cable segments received in the base of the clamp assembly 300. The term "messenger cable" is intended to broadly cover both configurations (separate first and second messenger cables and a single continuous cable in which the first and second messenger cables are segments of the single cable).

Each of the first and second assemblies 100, 200 can be modeled as a three-beam and three-mass system. The modeling theory will now be explored. With reference to the first assembly 100, the first beam-and-mass system includes the first messenger cable 110 and first primary weight 120, which has a coordinate system centered at M1 (the clamp assembly 300 and proximal end 110p of the first messenger cable 110) as noted above. The second beam-and-mass system is the first beam 130 and first secondary weight 150, which has a coordinate system centered at B1. The third beam-and-mass system is the second beam 140 and second secondary weight 160, which has a coordinate system centered at B2. The second and third beam-and-mass systems are on either side of the first beam-and-mass system in this model. The first primary weight 120 is considered to have rotation, while first and second secondary weights 150, 160 are considered to be point masses.

The damper 10 provides ten mode shapes corresponding to ten natural or resonant frequencies. The mode shapes include up-and-down oscillation (i.e., cyclical x' flexion about the local x axis and generally along the local y axis) of the various components. Such up-and-down oscillations may be referred to as vertical oscillations for convenience. FIGS. 3-7 illustrate the five mode shapes of the first assembly 100, it being understood that the second assembly 200 includes five mode shapes that mirror those of the first assembly 100, bringing to ten the total mode shapes for the damper 10.

Figure 3:
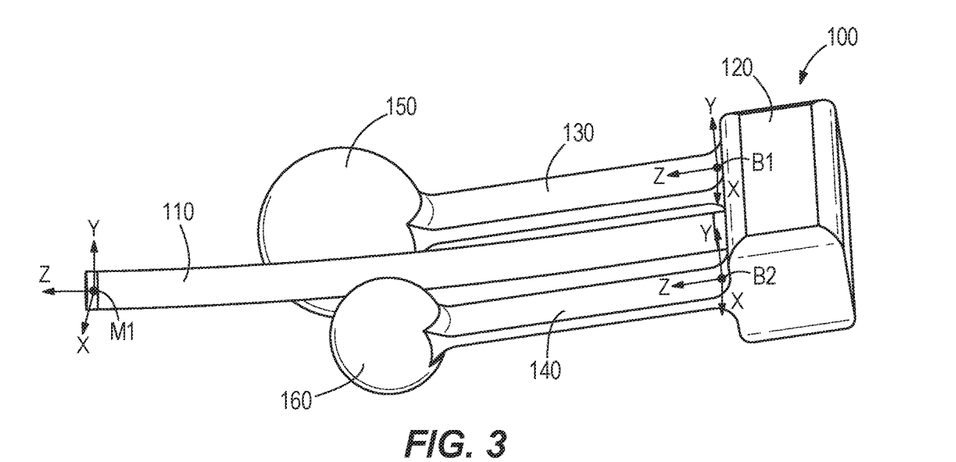
FIG. 3 is a perspective view of the first assembly of the vibration damper in a first mode shape.

FIG. 3 illustrates the first mode shape, in which the first primary weight 120 oscillates vertically at the end of the first messenger cable 110, with the first and second beams 130, 140 and first and second secondary weights 150, 160 remaining in their neutral positions. The neutral position of a component is essentially the at rest, unexcited state of the component. The first mode shape occurs at 4.7767 Hz in the illustrated embodiment.

Figure 4:
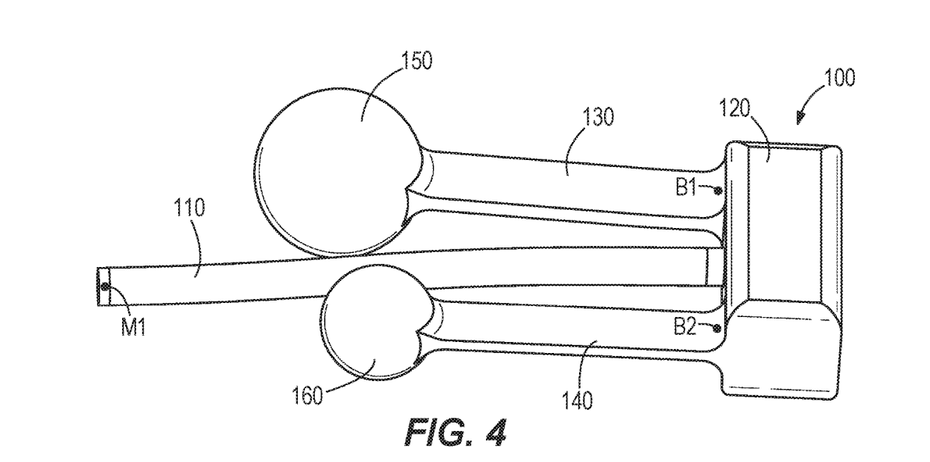
FIG. 4 is a perspective view of the first assembly of the vibration damper in a second mode shape.

FIG. 4 illustrates the second mode shape, in which the first secondary weight 150 oscillates vertically at the end of the first beam 130 while the first primary weight 120, second beam 140 and second secondary weight 160 remain neutral. The second mode occurs at 12.758 Hz in the illustrated embodiment.

Figure 5:
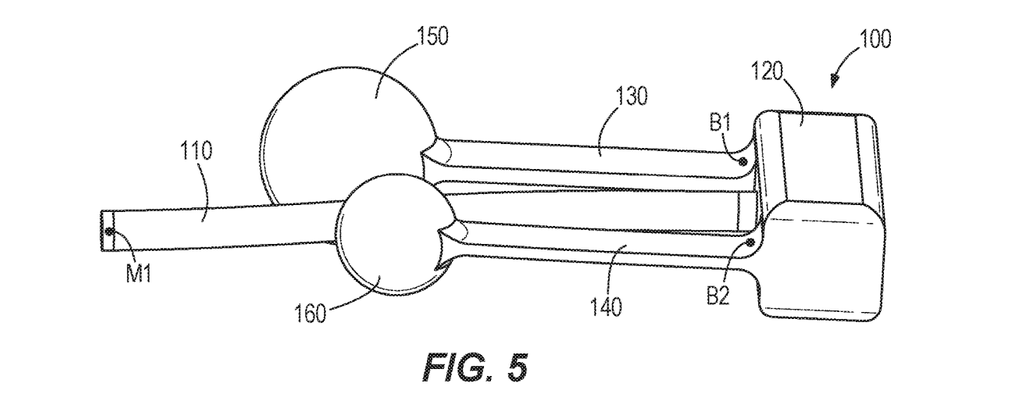
FIG. 5 is a perspective view of the first assembly of the vibration damper in a third mode shape.

FIG. 5 illustrates the third mode shape, in which the second secondary weight 160 oscillates vertically at the end of the second beam 140 while the first primary weight 120, first beam 130 and first secondary weight 150 remain neutral. The second mode occurs at 19.493 Hz in the illustrated embodiment.

Figure 6:
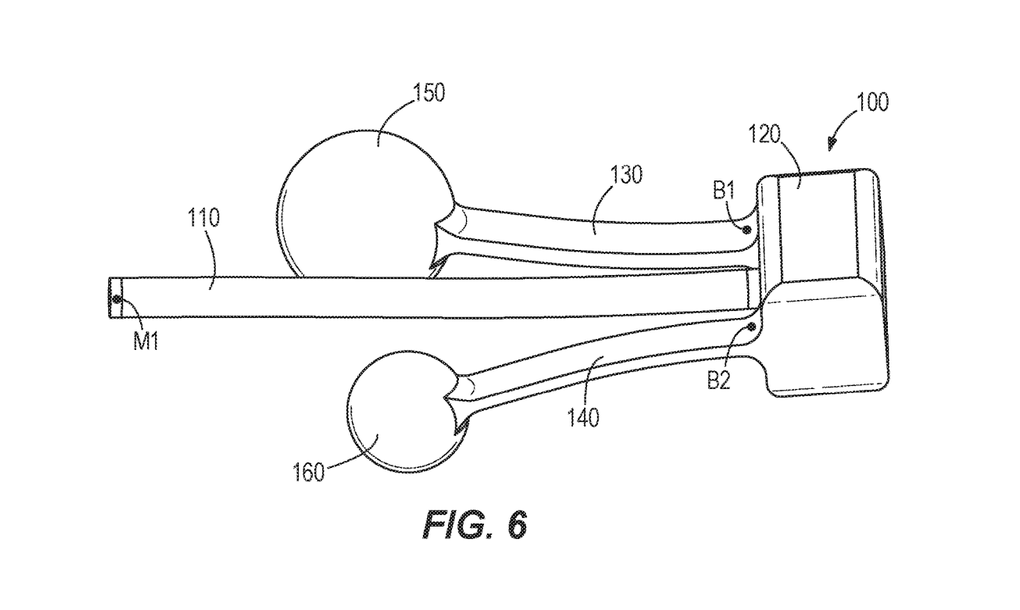
FIG. 6 is a perspective view of the first assembly of the vibration damper in a fourth mode shape.

FIG. 6 illustrates the fourth mode shape, in which the first and second secondary weights 150, 160 oscillate vertically at the end of the respective first and second beams 130, 140 while the first primary weight 120 remains neutral. The secondary weights 150, 160 in this mode are 180 degrees out of phase with each other, resulting in a scissors-kicking motion in which one of the secondary weights 150, 160 moves up while the other secondary weight 150, 160 moves down and vice-versa. The fourth mode occurs at 53.544 Hz in the illustrated embodiment.

Figure 7:
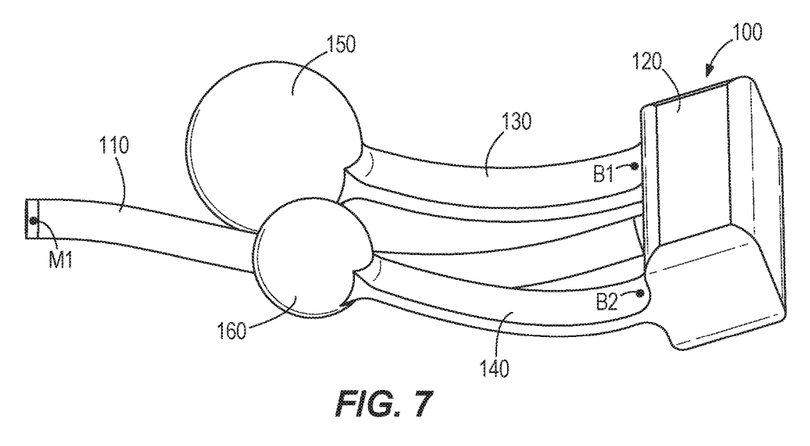
FIG. 7 is a perspective view of the first assembly of the vibration damper in a fifth mode shape.

FIG. 7 illustrates the fifth mode shape, in which the first and second secondary weights 150, 160 oscillate vertically at the end of the respective first and second beams 130, 140 while the first primary weight 120 remains neutral. The secondary weights 150, 160 in this mode are in phase with each other, resulting in a butterfly-kicking motion in which both of the secondary weights 150, 160 move up together and then both of the secondary weights 150, 160 move down together. The fifth mode occurs at 144.86 Hz in the illustrated embodiment.

As mentioned above, the second assembly 200 exhibits five modes, which are essentially mirror images of those described above for the first assembly 100. The addition five modes occur at frequencies of 3.2113 Hz, 9.9569 Hz, 15.793 Hz, 49.180 Hz, and 118.42 Hz.

Figure 9:
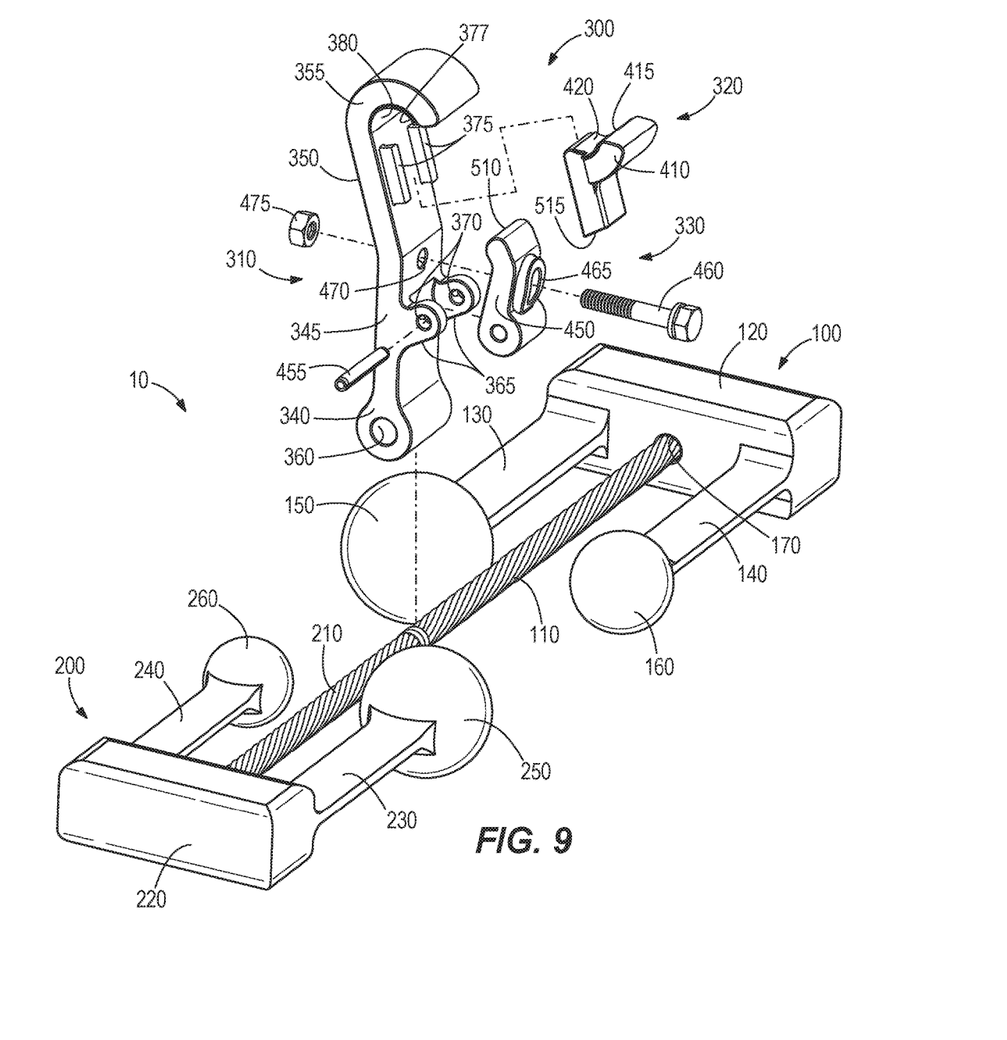
FIG. 9 is perspective view of the vibration damper with a clamp assembly exploded for illustration.

FIGS. 8-11 illustrate the clamp assembly 300 in detail. With reference to FIG. 9, the components of the illustrated embodiment of the clamp assembly 300 are a clamp body 310, slider 320, and toggle crank assembly 330. The clamp body 310 is a unitary component having a base 340, mid-body 345, neck 350, and head 355. The base 340 of the clamp body 310 includes a bore or messenger housing 360 that receives the proximal ends 110p, 210p of the first and second messenger cables 110, 210. As noted earlier, the messenger cables 110, 210 may comprise segments of a continuous cable that extends through the messenger housing 360. The mid-body 345 is above the base 340 and includes a pair of support arms 365 each with a mounting hole 370. The support arms 365 support the toggle crank assembly 330 as discussed below. The neck 350 is above the mid-body 345 and includes a pair of guides 375 that capture the slider 320 for linear sliding movement along the neck 350. The head 355 is hook-shaped and includes a curved surface 377 to receive the line 20. The curved surface 377, in the shape illustrated or in other suitable shapes for the application, may be referred to more generally as a first clamping surface. A rubber sleeve 380 may line the curved surface 377 of the clamp head 355 to improve grip on the line 20.

With particular reference to FIG. 8, the slider 320 includes a relatively low friction base 385 and a rigid force-transmitting insert 395. The insert 395 has a draft angle and fits into a slot in the low-friction base 385 which has a complimentary draft angle to capture the insert 395. The guides 375 define an undercut surface that captures the slider 320 and limits movement of the slider 320 to linear movement toward and away from the clamp head 355. The slider 320 includes a movable clamp portion 410 that defines a curved surface 415 for embracing the lower portion of the line 20. The curved surface 415, in the shape illustrated or in other suitable shapes for the application, may be referred to more generally as a second clamping surface. The curved surface 415 may have a rubber liner 420 to improve grip.

The toggle crank assembly 330 includes a toggle crank 450 that is pivotally connected to the support arms 365 by way of a spring pin 455 extending through mounting holes 370. The spring pin 455 biases the toggle crank 450 toward a disengaged position (FIG. 10) in which the toggle crank 450 permits the slider 320 to move away from the clamp head 355. The toggle crank assembly 330 includes a bolt 460 extending through a slot 465 in the toggle crank 450 and through a hole 470 in the clamp body 310. The bolt 460 and other suitable alternatives may more generally be referred to as an actuating mechanism. A nut 475 or other threaded receptacle is threaded onto the bolt 460 on the back side of the clamp body 310. As an alternative to the nut 475, the hole 470 could be threaded. Rotation of the bolt 460 in a first direction with respect to the nut 475 causes the bolt 460 to advance into the toggle crank 450 which pivots the toggle crank 450 toward the clamp body 310 and toward an engaged position (FIG. 11). Rotation of the bolt 460 in a second direction opposite the first direction causes the bolt 460 to retreat from the toggle crank 450, which permits the toggle crank 450 to pivot (e.g., under the biasing force of the spring pin 455 toward a disengaged position (FIG. 10).

The toggle crank 450 includes a cam surface 510 at its distal end, which engages a ramped surface 515 at the lower end of the slider 320. As the toggle crank 450 pivots from the disengaged position (FIG. 10) toward the engaged position (FIG. 11), the cam surface 510 pivots against and slides along the ramped surface 515. This causes the slider 320 to slide from a disengaged position (FIG. 10) toward an engaged position (FIG. 11). The slot 465 accommodates pivoting of the toggle crank 450 with respect to the bolt 460 so that the bolt 460 remains substantially horizontal through the range of motion of the toggle crank 450. The toggle crank 450 includes a curved surface around the slot 465, which the bolt head engages to permit the bolt head to seat against the toggle crank 450 through a wide range of angles as the toggle crank 450 is moving into the engaged position. A lock washer or spring washer can be employed between the bolt head and curved surface to reduce the likelihood of the bolt 460 jiggling loose. The engagement of the cam surface 510 against the ramped surface 515 results in a theoretically infinite force as the crank 450 approaches the end of its engaged position, which results in a very high clamping force of the curved surface 415 of the slider 320 and the curved surface 377 of the clamp head 355 against the line 20.

Thus, the invention provides, among other things, an Aeolian vibration damper having at least six resonant frequencies and a clamping assembly for attaching the vibration damper to a line. Various features and advantages of the invention are set forth in the following claims.

What is claimed is:

1. A vibration damper comprising:
a clamp assembly to mount the vibration damper to a line;
a first messenger cable extending in a first direction from the clamp assembly and having an end affixed to a first primary weight to dampen vibrations through flexion of the first messenger cable and oscillation of the first primary weight with respect to the clamp assembly;
a second messenger cable extending in a second direction opposite the first direction from the clamp assembly and having an end affixed to a second primary weight to dampen vibrations through flexion of the second messenger cable and oscillation of the second primary weight with respect to the clamp assembly;
a first beam extending from the first primary weight and having an end affixed to a first secondary weight to dampen vibrations through flexion of the first beam and oscillation of the first secondary weight with respect to the first primary weight;
a second beam extending from the first primary weight and having an end affixed to a second secondary weight to dampen vibrations through flexion of the second beam and oscillation of the second secondary weight with respect to the first primary weight;
a third beam extending from the second primary weight and having an end affixed to a third secondary weight to dampen vibrations through flexion of the third beam and oscillation of the third secondary weight with respect to the second primary weight; and
a fourth beam extending from the second primary weight and having an end affixed to a fourth secondary weight to dampen vibrations through flexion of the fourth beam and oscillation of the fourth secondary weight with respect to the second primary weight;
wherein each of the first, second, third, and fourth beams includes a vertically-facing surface having a relatively large surface area and a horizontally-facing surface having a relatively small surface area such that an area moment of inertia of each beam is larger about an axis perpendicular to the vertically-facing surface than about an axis perpendicular to the horizontally-facing surface.

2. The vibration damper of claim 1, wherein the cables, weights, and beams of the vibration damper act independently or in combination when dampening vibrations applied to the clamp assembly corresponding to six to ten different resonant frequencies of the vibration damper.

3. The vibration damper of claim 1, wherein the first messenger cable is of a different length than a length of the second messenger cable.

4. The vibration damper of claim 1, wherein the first primary weight has a mass that is different from a mass of the second primary weight.

5. The vibration damper of claim 1, wherein the first primary weight oscillates in a twisting motion about a longitudinal axis of the first messenger cable and the second primary weight oscillates in a twisting motion about a longitudinal axis of the second messenger cable.

6. The vibration damper of claim 1, wherein:
the first beam and the second beam extend from the first primary weight toward the clamp assembly; and
the third beam and the fourth beam extend from the second primary weight toward the clamp assembly.

7. The vibration damper of claim 1, wherein:
the first and second beams extend parallel to the first messenger cable and are positioned on opposite sides of the first messenger cable; and
the third and fourth beams extend parallel to the second messenger cable and are positioned on opposite sides of the second messenger cable.

8. The vibration damper of claim 1, wherein each of the first, second, third, and fourth secondary weights has the oscillation characteristics of a point mass to minimize inertial rotating forces about any axis through the center of mass of the secondary weights.

9. The vibration damper of claim 1, wherein each of the first, second, third, and fourth secondary weights are spherical or any other lumped shape that maintains reasonably point mass characteristics to minimize inertial rotating forces about any axis through the center of mass of the secondary weights.

10. The vibration damper of claim 1, wherein the clamp assembly includes:
a clamp body including a messenger housing to which each of the first and second messenger cables are secured, and a clamp head to partially surround a line to which the clamp assembly is mounted;
a slider for movement into engagement with the line to capture the line against the clamp head; and
an actuator to move the slider into engagement with the line.

11. The vibration damper of claim 10, wherein the slider is slidably mounted to the clamp body and moves linearly with respect to the clamp body.

12. The vibration damper of claim 10, wherein:
the actuator includes a pivoting member pivotably coupled to the clamp body and a fastener engaging both the clamp body and the pivoting member to pivot the pivoting member in a tightening direction; and
movement of the pivoting member in the tightening direction moves the slider into engagement with the line.

13. A vibration damper comprising:
a clamp assembly to mount the vibration damper to a line;
a first messenger cable extending in a first direction from the clamp assembly and having an end affixed to a first primary weight to dampen vibrations through flexion of the first messenger cable and oscillation of the first primary weight with respect to the clamp assembly;
a second messenger cable extending in a second direction opposite the first direction from the clamp assembly and having an end affixed to a second primary weight to dampen vibrations through flexion of the second messenger cable and oscillation of the second primary weight with respect to the clamp assembly;
a first beam extending from the first primary weight and having an end affixed to a first secondary weight to dampen vibrations through flexion of the first beam and oscillation of the first secondary weight with respect to the first primary weight;
a second beam extending from the first primary weight and having an end affixed to a second secondary weight to dampen vibrations through flexion of the second beam and oscillation of the second secondary weight with respect to the first primary weight;

a third beam extending from the second primary weight and having an end affixed to a third secondary weight to dampen vibrations through flexion of the third beam and oscillation of the third secondary weight with respect to the second primary weight; and a fourth beam extending from the second primary weight and having an end affixed to a fourth secondary weight to dampen vibrations through flexion of the fourth beam and oscillation of the fourth secondary weight with respect to the second primary weight;

wherein each of the first, second, third, and fourth secondary weights has a unique mass value to contribute to multiple resonant frequencies of the vibration damper.

14. The vibration damper of claim 13, wherein each of the first, second, third, and fourth beams includes a vertically-facing surface having a relatively large surface area and a horizontally-facing surface having a relatively small surface area such that an area moment of inertia of each beam is larger about an axis perpendicular to the vertically-facing surface than about an axis perpendicular to the horizontally-facing surface.

15. A clamp assembly comprising:
a clamp body including a clamp head defining a first clamping surface;
a slider mounted to the clamp body for linear sliding motion with respect to the clamp head, the slider defining a second clamping surface facing the first clamping surface;
a toggle crank pivotably mounted to the clamp body and including a cam surface in contact with the slider; and
an actuator to pivot the toggle crank toward the clamp body, such that interaction of the cam surface against the slider slides the slider toward the clamp head and generates a theoretically infinite clamping force between the first and second clamping surfaces.

16. The clamp assembly of claim 15, wherein the actuator includes a bolt extending through the toggle crank and threaded into the clamp body, rotation of the bolt with respect to the clamp body moving the toggle crank toward the clamp body.

17. The clamp assembly of claim 16, wherein the toggle crank includes a slot through which the bolt extends, the slot accommodating pivoting movement of the toggle crank with respect to the bolt.

18. The clamp assembly of claim 15, wherein the clamp body includes an arm to which the toggle crank is pinned to enable pivotable movement of the toggle crank with respect to the clamp body.

19. The clamp assembly of claim 15, further comprising a pair of guides to restrain movement of the slider away from the clamp body and to guide linear sliding movement of the slider with respect to the clamp body.

20. The clamp assembly of claim 15, wherein the slider includes a low friction surface in engagement with the clamp body to facilitate sliding movement of the slider with respect to the clamp body.

21. A vibration damper comprising:
a clamp body;
a first messenger cable extending in a first direction from the clamp body and having an end affixed to a first primary weight to dampen vibrations through flexion of the first messenger cable and oscillation of the first primary weight with respect to the clamp body;

a second messenger cable extending in a second direction opposite the first direction from the clamp body and having an end affixed to a second primary weight to dampen vibrations through flexion of the second messenger cable and oscillation of the second primary weight with respect to the clamp body;

a first beam extending from the first primary weight and having an end affixed to a first secondary weight to dampen vibrations through flexion of the first beam and oscillation of the first secondary weight with respect to the first primary weight;

a second beam extending from the first primary weight and having an end affixed to a second secondary weight to dampen vibrations through flexion of the second beam and oscillation of the second secondary weight with respect to the first primary weight;

a third beam extending from the second primary weight and having an end affixed to a third secondary weight to dampen vibrations through flexion of the third beam and oscillation of the third secondary weight with respect to the second primary weight; and a fourth beam extending from the second primary weight and having an end affixed to a fourth secondary weight to dampen vibrations through flexion of the fourth beam and oscillation of the fourth secondary weight with respect to the second primary weight;

wherein each of the first, second, third, and fourth beams includes a vertically-facing surface having a relatively large surface area and a horizontally-facing surface having a relatively small surface area such that an area moment of inertia of each beam is larger about an axis perpendicular to the vertically-facing surface than about an axis perpendicular to the horizontally-facing surface.

22. A vibration damper comprising:
a clamp body;
a first messenger cable extending in a first direction from the clamp body and having an end affixed to a first primary weight to dampen vibrations through flexion of the first messenger cable and oscillation of the first primary weight with respect to the clamp body;

a second messenger cable extending in a second direction opposite the first direction from the clamp body and having an end affixed to a second primary weight to dampen vibrations through flexion of the second messenger cable and oscillation of the second primary weight with respect to the clamp body;

a first beam extending from the first primary weight and having an end affixed to a first secondary weight to dampen vibrations through flexion of the first beam and oscillation of the first secondary weight with respect to the first primary weight;

a second beam extending from the first primary weight and having an end affixed to a second secondary weight to dampen vibrations through flexion of the second beam and oscillation of the second secondary weight with respect to the first primary weight;

a third beam extending from the second primary weight and having an end affixed to a third secondary weight to dampen vibrations through flexion of the third beam and oscillation of the third secondary weight with respect to the second primary weight; and a fourth beam extending from the second primary weight and having an end affixed to a fourth secondary weight to dampen vibrations through flexion of the fourth beam and oscillation of the fourth secondary weight with respect to the second primary weight;

wherein each of the first, second, third, and fourth secondary weights has a unique mass value to contribute to multiple resonant frequencies of the vibration damper.

\* \* \* \* \*